March 12, 1963     D. W. HUGHES, JR     3,081,373
INTEGRAL BATTERY MULTIPLE CELL COVER
Filed May 24, 1961
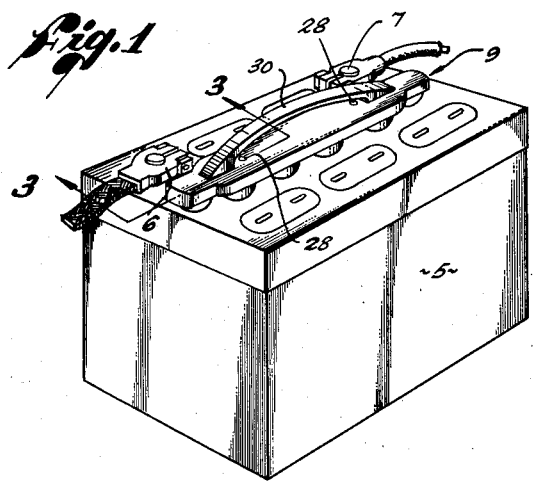
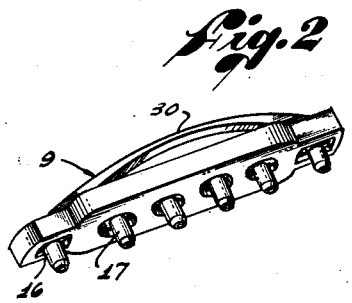
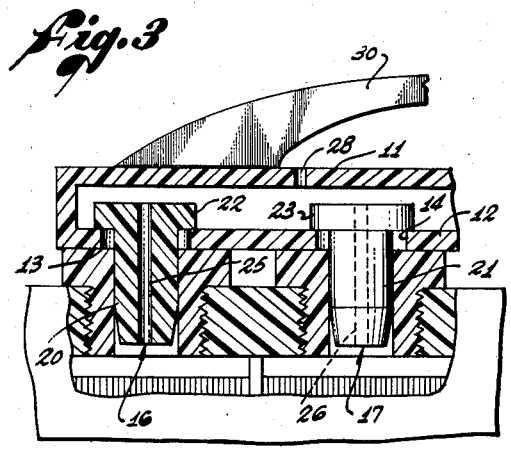
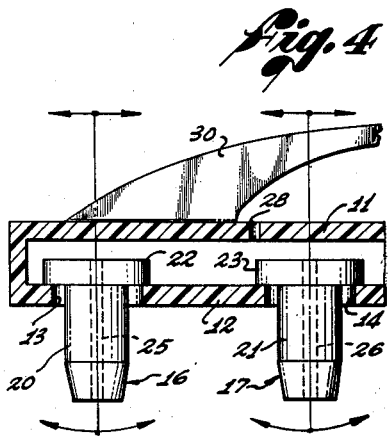
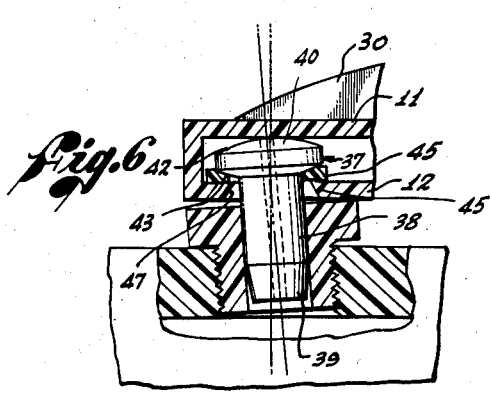
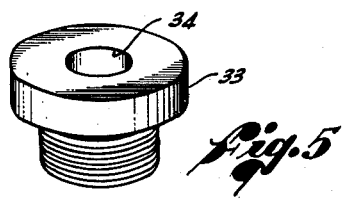
INVENTOR.
DONALD W. HUGHES Jr.
BY
Attorney United States Patent Office 3,081,373
Patented Mar. 12, 1963

3,081,373
INTEGRAL BATTERY MULTIPLE CELL COVER
Donald W. Hughes, Jr., 3908 S. Rambla Orienta,
Malibu, Calif.
Filed May 24, 1961, Ser. No. 112,321
1 Claim. (Cl. 136—177)

This invention relates to storage battery closure devices, and particularly to a unitary closure for simultaneously opening and closing the cells of a multiple cell storage battery.

Storage battery closures of this general type have been suggested, such as evidenced by U.S. Patents Nos. 2,281,800, of May 5, 1942; 2,570,123, of October 2, 1951; and 2,881,239, of April 7, 1959.

The use of a unitary closure for storage batteries speeds up the time required for inspection of the cells of the battery and for replenishing the liquid in the different cells. It is well known that storage batteries are of various types, although the openings to the cells are in general alignment across the center of the battery. However, they usually are not in accurate alignment so that any unitary fixed or rigid closure member will not be suitable or applicable to the majority of present-day storage batteries.

The present invention is directed to a construction which is adapted to accommodate storage batteries having misalignments of the openings to the cells and will provide a tight and leakproof closure for the majority of storage batteries.

To provide the automatic adjustment, the axis of each plug or stopper for the openings is self-adjusting to coincide with the axis of the hole, even though the axes of all of the openings to the cells are not in a single plane and the openings vary vertically. This is accomplished by having each stopper or plug float within the frame of the unit so that it can align its axis with the axis of the opening to the cell.

The principal object of the invention, therefore, is to facilitate access to the multiple cells of a storage battery and the simultaneous closure thereof.

Another object of the invention is to provide an improved unitary closure for a multiple cell storage battery.

A further object of the invention is to provide an improved unitary closure for a multiple cell storage battery in which each stopper or plug is self-adjusting to any misalignment of the openings of the cells.

A better understanding of this invention may be had from the following detailed description when read in connection with the accompanying drawings, in which:

FIG. 1 is a perspective view showing the invention attached to a storage battery;

FIG. 2 is a perspective bottom view of the unitary closure itself;

FIG. 3 is a partial cross-sectional view taken along the line 3—3 of FIG. 1;

FIG. 4 is an enlarged detail view showing the relative dimensions of the elements of the closure;

FIG. 5 is a perspective view of an adapter used with the invention; and

FIG. 6 is a detail view of a modification of a stopper to correct for vertical axis deviation of the cell openings.

Referring, now, to the drawings in which the same reference numerals indicate the same elements, a general type of 6-cell storage battery 5 is shown with a terminal 6 and a terminal 7. Positioned over the cells is the closure member shown generally at 9. This closure unit consists of two spaced parallel frame members 11 and 12 and connected at their ends and along their edges in any suitable manner, the frame being of a suitable acid-resistant plastic or of hard rubber. The ends of the frame members are made narrow to avoid the battery terminals.

In the lower frame member 12 is a plurality of holes, as shown at 13 and 14 in FIGS. 3 and 4, the positioning of these holes being in general alignment with the spacing of the openings to the cells of the storage battery.

In each of the holes is a stopper or plug such as 16 and 17, as shown in FIGS. 3 and 4, these plugs having a circular cross-section for both the stems 20 and 21 and their heads 22 and 23, respectively, the openings 13 and 14 also being circular. Through each of the plugs 16 and 17 is a vent hole such as shown at 25 and 26, while vent holes 28 are shown in the upper plate 11. Across the top of the upper plate 11 is a handle 30, which may have any suitable form. It will be noted that the diameter of the stems 20 and 21 of the stoppers or plugs is smaller than the diameter of the openings 13 and 14, so that the stoppers may adjust themselves within the distance variation between these diameters.

Furthermore, the thickness of the heads 22 and 23 is less than the distance between the opposite inner surfaces of the frame members 11 and 12, so that there is a vertical axial adjustable range for each stopper. Should the battery openings be accurate in a vertical direction, the thickness of the heads may be substantially the same as the distance between the frame members. In this event, the vent holes will exit from the edges of the heads of the plugs. Thus, should the axes of the holes of the cells be misaligned, each of the stoppers will adjust itself to the position of its respective hole so that a tight, leakproof cell is obtained when the closure unit is placed on the battery. In this manner, applicant's closure can be used for the large majority of storage batteries now in use.

Since the holes to the cells of most present type storage batteries are provided with threads, applicant has an adapter 33, shown in FIG. 5, for threading into the threaded openings to the cells, the adapters having therein a hole 34 having an inside diameter of the same size as the diameter of the stems of the stoppers. Thus, applicant's closure may be made suitable for present types of batteries. The heads of the adapters are sufficiently large to provide a stable seat for the lower plate 12. Furthermore, because of the battery terminals, the end adapters have smaller outside diameter heads, while the stopper heads may be of a size to be accommodated in the narrow ends of the frame members. If a battery is made without the threaded holes but has smooth holes of the size of the stems of the stoppers of the invention, the adapters are not required. The lower ends of the stoppers may be tapered, as shown in the drawings, to rapidly direct the stopper to the proper axial position. The stems of the stoppers could also be slightly tapered if desired.

Referring, now, to FIG. 6, a modification of the stoppers or plugs is shown in the event correction is required for vertical axis deviation of the openings to the cells. The plug 37 has a stem 38 circular in cross section with a tapered end 39 and a head 40 which has spherically curved surfaces 42 and 43, the surface 42 contacting the frame member 11. The lower surface 43 is normally in contact with the inner edge of an annular seat 45 which has a radius of curvature slightly greater than the radius of curvature of the surface 43. The seat 45 is free to move laterally between the frame members when the stem 38 has to shift to align its axis with the axis of the opening, the seat 45 and curved surface 43 permitting the stem to vary angularly to accommodate any deviation of the axis of the opening from the vertical. A similar seat could be empolyed for the surface 42. To aid the rotary adjustment, the holes in the member 12 are beveled as shown at 47. Any suitable type of closure holding device may be used, such as spring dedents, clamps, magnets, or solely by friction.

With the vertical adjustment shown in FIGS. 3 and 4, it is to be understood that screws may be threaded through top member 11 above each plug so that after a closure has been adjusted to a certain battery, the plugs may be locked in their respective positions. If certain batteries have other configurations for the openings to the cells, the frame 11 will be constructed accordingly.

With the present invention, therefore, to inspect the cells of a battery, it is only necessary to lift the unitary closure, which will simultaneously expose all of the cells of the battery, and after inspection or the addition of fluid, all of the cells may be simultaneously closed by placing the closure in position as shown in FIG. 1, each plug or stopper automatically adjusting to its respective opening.

I claim:

A unitary closure for a multiple cell battery comprisingn a battery, said closure for the cells of said battery including a frame having two rigid parallel spaced members fixedly interconnected at the ends and edges thereof, a handle connected to one of said members, the other member having a row of holes therein corresponding in general position to the openings to the cells of said battery, a cell opening stopper in each of said holes, said stoppers having stems with portions positioned in said holes and portions adapted to be positioned in said cell openings, and heads positioned between said spaced members, said handle being adapted to simultaneously and axially remove all of said stoppers from said holes, both surfaces of the heads of said stoppers having spherically curved surfaces to permit rotation of said stoppers for axially aligning said stoppers with the axes of the openings to said cells.

References Cited in the file of this patent
UNITED STATES PATENTS

| | | |
|---|---|---|
| 1,469,119 | Stallings | Sept. 25, 1923 |
| 2,570,123 | Heine | Oct. 2, 1951 |